United States Patent

Schwarz

[15] 3,641,348
[45] Feb. 8, 1972

[54] THERMAL IMAGING SYSTEM WITH THERMAL IMAGE SUPERIMPOSED ON A TARGET SCENE

[72] Inventor: Frank Schwarz, Stamford, Conn.
[73] Assignee: Barnes Engineering Company, Stamford, Conn.
[22] Filed: July 24, 1969
[21] Appl. No.: 844,248

[52] U.S. Cl. .................. 250/83.3 HP, 250/83.3 H, 250/233
[51] Int. Cl. ......................................... G01j 1/02, G01j 1/10
[58] Field of Search ................. 250/83.3 H, 83.3 HP, 233

[56] References Cited

UNITED STATES PATENTS

| | | | |
|---|---|---|---|
| 2,974,230 | 3/1961 | Harris | 250/83.3 H |
| 3,007,051 | 10/1961 | Amara et al. | 250/83.3 H |
| 3,327,125 | 6/1967 | Herchenroeder | 250/233 |

*Primary Examiner*—Archie R. Borchelt
*Attorney*—Joseph Levinson and Robert Ames Norton

[57] ABSTRACT

A field of view which is sighted through a telescope is simultaneously scanned by a rotating reticle and applied to an infrared detector to derive thermal information from the field of view. A light source is modulated by the infrared channel and the intensity-modulated light source is imaged through the same reticle and superimposed on the sight of the telescope. The operator will thus see in the telescope the view of the target scene with a red tinge in those regions in which the target is warm or overheated.

5 Claims, 6 Drawing Figures

3,641,348

THERMAL IMAGING SYSTEM WITH THERMAL IMAGE SUPERIMPOSED ON A TARGET SCENE

BACKGROUND OF THE INVENTION

Infrared techniques for remote temperature measurement of materials and processes are finding greater acceptance in many applications. When the target is moving, covers a wide area, or cannot be approached closely, or is too small, the infrared remote sensing techniques have proven to be an extremely useful diagnostic technique. Then, too, in many instances one of the most important considerations is that the temperature must be taken without the measurement itself disturbing the condition under which the temperature is taken. For many applications simple infrared radiometric techniques using a single temperature measurement have proven adequate, while in others the thermal pattern of the entire target area would be more meaningful. Merely as one example, power companies may which is utilize real time thermographic displays obtained by scanning powerlines and other equipment, such as cables, splices, insulators, transformers, etc., from a moving vehicle traveling along roads at a fairly high rate of speed. Other installation inspections may be performed using an aerial scan, from a helicopter for example. For such applications, and many others, the available infrared cameras which might be utilized to perform such checks are either too bulky, complex, or too slow to be used on a vehicle which is in motion. In addition, such equipment may be prohibitively expensive for a particular application.

Another problem encountered is the interpretation of the thermal image once it is obtained. In a thermal presentation hotter areas of the target scene appear lighter grey or white, while cool areas of the target scene appear darker grey to black. It is at times difficult to identify the object under observation, which increases the problem of identifying the location of a hot spot on the object. The present invention is directed to the solution of these problems.

SUMMARY OF THE INVENTION

In carrying out this invention in one illustrative embodiment thereof, a thermal imaging system is provided with means for directly viewing the target scene. The system includes an infrared detector which is scanned over the field of view for producing signals in accordance with the infrared radiation in the field of view from which is recreated a thermal image of the target scene which is superimposed upon the target scene in order to enable the operator to readily determine which areas of the target scene are elevated in temperature.

DETAILED DESCRIPTION OF THE PREFERRED EMBODIMENTS

Figure 1:
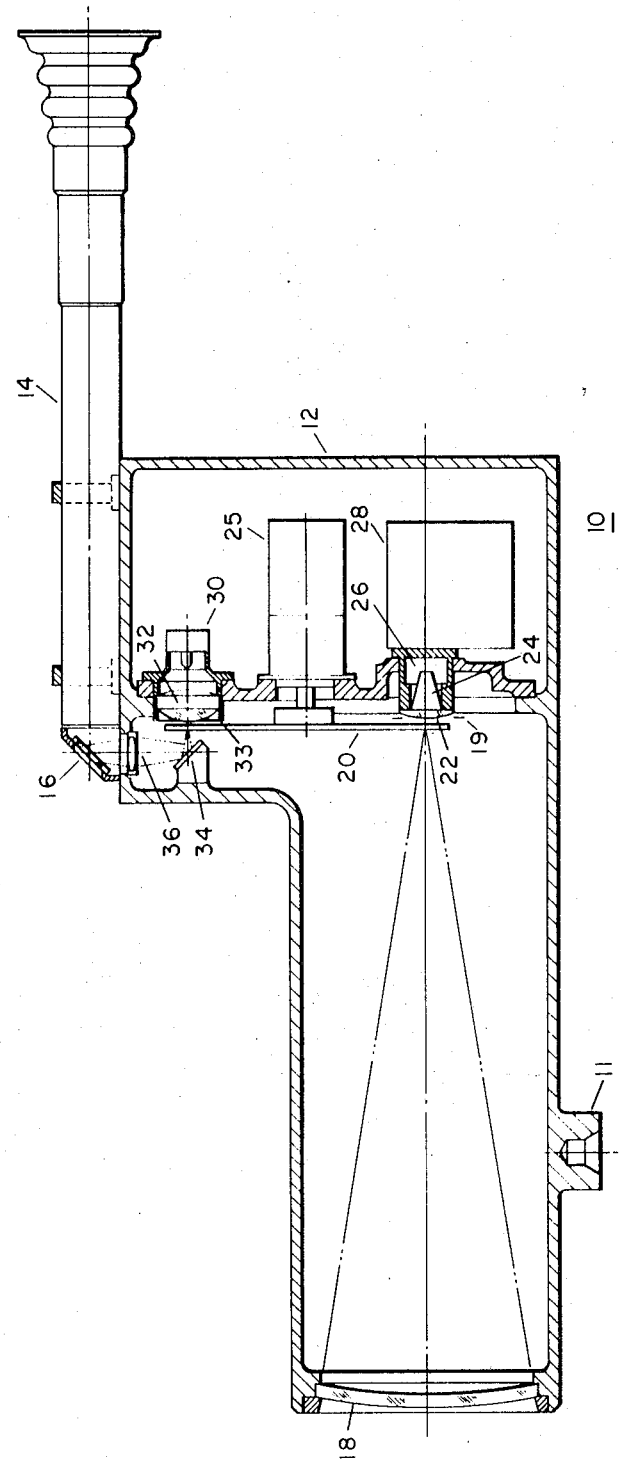
FIG. 1 is a plan view of the thermal imaging system embodied in this invention.

Referring now to FIG. 1, the thermal imaging system is referred to generally with the reference character 10, and is mounted in a housing 12 provided with a ball joint mount 11 for accommodating an A-pod or tripod mount. For ease of handling in positioning or rotating the thermal image system thereto. Mounted on the housing 12 is an optical means shown in the form of a telescope 14 for sighting so that the observer can view the target scene. A dichroic mirror 16 is placed directly in front of the telescope 14 and 45° angle so that the target scene will appear to the observer in blue or green, depending upon the type of dichroic used. The dichroic mirror 16 will at the same time reflect red light provided by the system, which constitutes the superimposed IR display. Although a telescope 14 is illustrated, other optical means may be used for observing the target scene by the human eye.

In the front of the housing 12 is positioned a lens 18, transparent to the infrared energy in the field of view, which for example may be made of germanium, the lens being focused for infinity. In the situation where the telescope views a 2°×2° field of view, the germanium lens diameter be on the order of 3 inches with a focal length of 9 inches. The lens 18 applies energy from he field of view through a scanning reticle 20 shown in the from of a reticle disc containing holes arranged in a helical pattern which performs the function of scanning a detector over the field of view. A field lens 22 having a mask 19 in the front thereof is positioned behind the reticle 20, which in combination with a pyramid collecting cone 24 concentrates the energy received through the Nipkow disc 20 onto an infrared detector 26. The type of infrared detector employed will depend on the particular application for which the system is to be utilized. For purposes of this disclosure, a pyroelectric detector assembly, such as that shown and described in an application entitled "Pyroelectric Detector Assembly," Ser. No. 692,379, now U.S. Pat. No. 3,539,803 which is assigned to the assignee of the present invention, will be utilized for purposes of disclosure. It will be appreciated, however, that other types of infrared detectors may be utilized, depending upon the application. For example, cooled indium antimonide detectors would be suitable.

Figure 2:
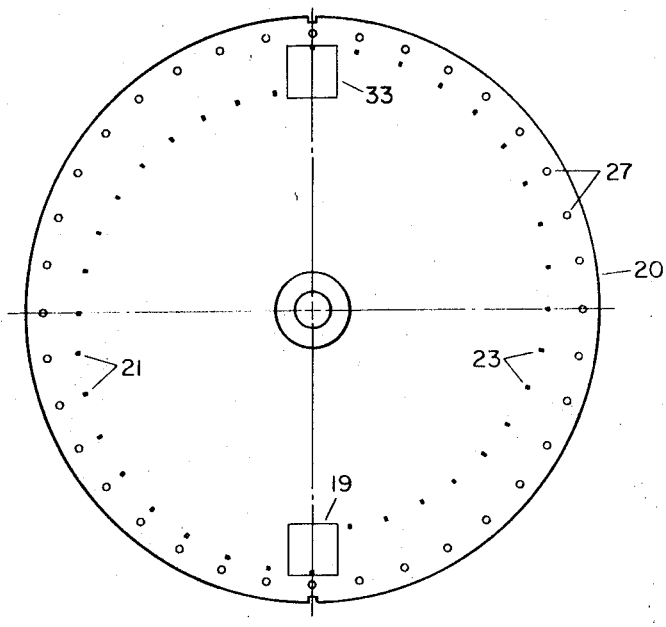
FIG. 2 is a front elevation view of one type of scanning reticle which may be utilized in FIG. 1.
Figure 3:
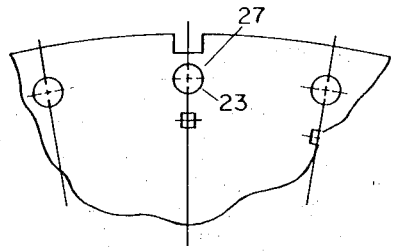
FIG. 3 is an enlarged view of a section of the scanning reticle of FIG. 2.

The scanning reticle 20, which is driven by a motor 25, is best shown in FIGS. 2 and 3. The reticle 20 is in the form of a Nipkow disc with two sets of holes 21 and 23, which permits the simultaneous scanning of the IR image through one set of holes 21 and the display of a modulated light source through the second set of holes 23. The reverse is true for the next frame. Accordingly, with the design illustrated, two frames are produced for each revolution of the reticle with holes 21 and 23 alternately scanning the field and then being used for playback. A third set of holes 27 is provided around the periphery of the disc 20 to provide synchronization pulses which will be described in connection with the electrical schematic of FIG. 4. The helical configuration of the hole pattern allows each hole to scan the line successively in the field of view forming a frame. With a scanning speed of 15 revolutions per second, run by a 900 r.p.m. motor, and with a 2-milliradian resolution, the instrument will scan 300 elements 15 times per second, which is equal to 4,500 elements per second. Although the specific hole configuration of the disc will depend on the particular application, and a variety of patterns may be utilized, for purposes of illustration the following table show hole location as shown in FIG. 2, using a total of 36 holes and dividing the circle into 10° segments:

HOLE LOCATION TABLE

| Angle | Radius | Angle | Radius |
|---|---|---|---|
| 0° | 1.800 | 180° | 1.800 |
| 10° | 1.782 | 190° | 1.782 |
| 20° | 1.764 | 200° | 1.764 |
| 30° | 1.746 | 210° | 1.746 |
| 40° | 1.728 | 220° | 1.728 |
| 50° | 1.710 | 230° | 1.710 |
| 60° | 1.692 | 240° | 1.692 |
| 70° | 1.674 | 250° | 1.674 |
| 80° | 1.656 | 260° | 1.656 |
| 90° | 1.638 | 270° | 1.638 |
| 100° | 1.620 | 280° | 1.620 |
| 110° | 1.602 | 290° | 1.602 |
| 120° | 1.584 | 300° | 1.584 |
| 130° | 1.566 | 310° | 1.566 |
| 140° | 1.548 | 320° | 1.548 |
| 150° | 1.530 | 330° | 1.530 |
| 160° | 1.512 | 340° | 1.512 |
| 170° | 1.494 | 350° | 1.494 |

As stated above, a variety of hole patterns may be employed depending on the size of the reticle and the resolution desired. For example, an interlaced pattern may be provided, or even a random pattern. At least two sets of holes or a multiple, e.g., four sets, are preferred, such that one set is scanning while another, which is also used for scanning the field of view, is used for playback. It is possible, however, to use only one set of holes, in which case a one-line displacement in the playback would occur.

Referring again to FIG. 1, signals developed by the detector assembly 26 resulting from the scanning of the detector over the field of view by the reticle 20 are processed in the electronics 28. The output thereof from the electronics 28 is applied to intensity modulate a light source 30, such as a glow modulator tube, a light-emitting diode, or any other suitable form of modulatable light source. The light source 30 has a field lens system 32 and a mask 33 which applies the modulated output from the light source 30 through the reticle 20 onto a 45° folding mirror to create a thermal image of the field of view in visual form. The 45° folding mirror 34 is positioned directly behind the reticle 20 to throw the displayed thermal image upwards through a transfer lens 36 onto the dichroic mirror 16 and accordingly superimpose the IR image from the field of view onto the visible image.

Figure 4:
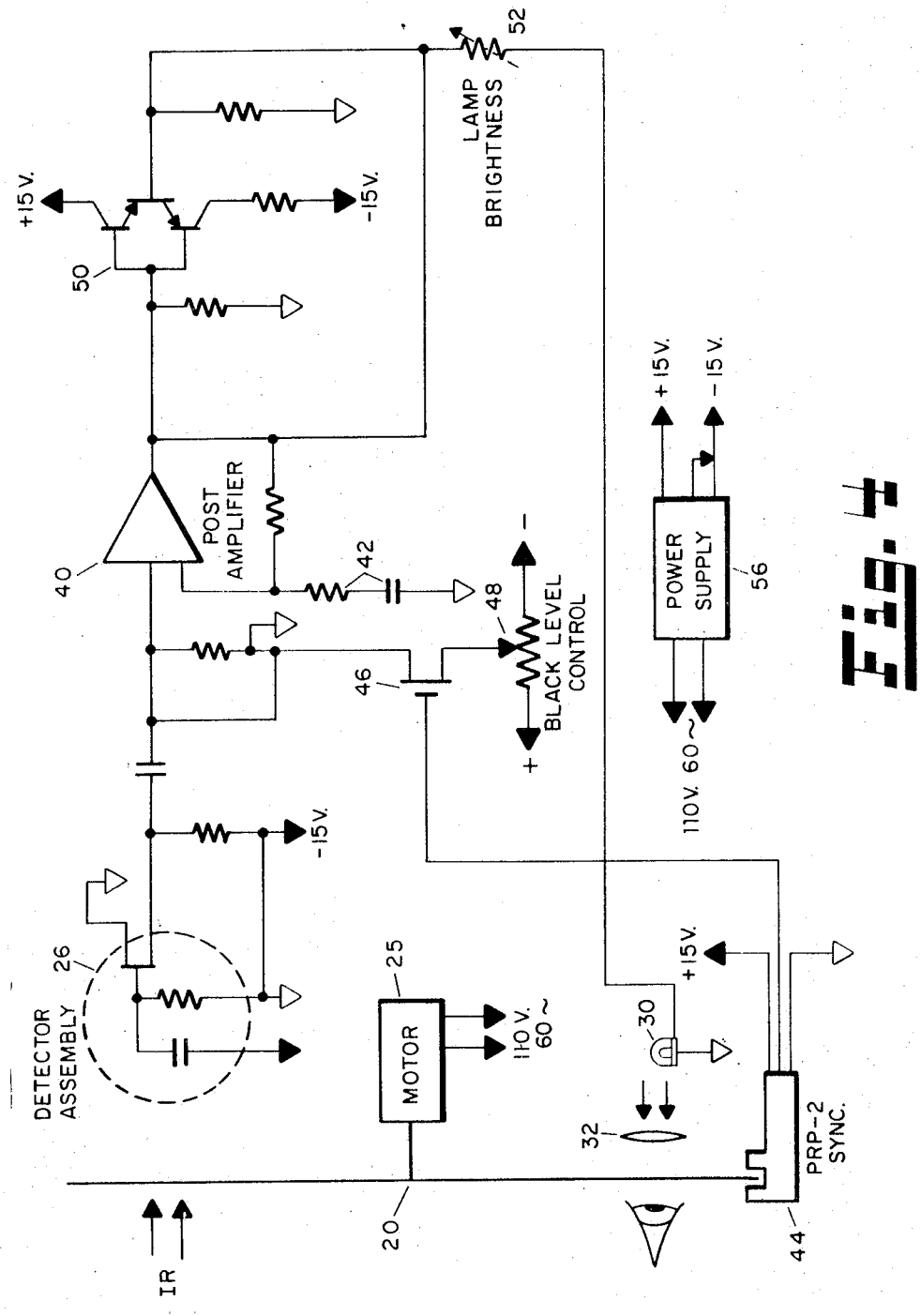
FIG. 4 is a schematic diagram illustrating one form of electronic processing circuitry which may be utilized in the thermal imaging system of FIG. 1.

One suitable form of signal processing for the thermal image system 10 is illustrated in the schematic diagram of FIG. 4. Infrared radiation from the field of view is applied through the reticle 20 to the detector assembly 26 which, as described in the aforesaid patent application, includes a field effects transistor in an evacuated detector housing to perform the function of matching the high impedance of the pyroelectric detector with that of conventional amplifiers. The output of the detector assembly 26 is applied to a post amplifier 40 which also has an RC network 42 connected to one of its inputs for controlling the frequency response of the system. The network 42 in conjunction with the detector frequency characteristic produces a flat overall system response over the frequency range of interest. A photodiode synchronization pickup 44, which is attached to the edge of the reticle 20 (not shown in FIG. 1), and in conjunction with the holes 27 in the reticle 20, provides blanking pulses to a MOS FET switch 46 which is connected to the input of the postamplifier 20 to clamp the signal from the detector assembly to an adjustable voltage via a potentiometer 48 which serves for setting a reference black level for the thermal image. The holes 27 are so arranged that the detector assembly 26 is clamped to the black level at the end of each line. The output of the postamplifier 40 is applied to a modulator drive circuit 50 whose output is applied through a variable resistor 52, which acts as a brightness control to a modulatable light source 30. Accordingly, the light source 30 is modulated by the signal output of the detector assembly 26 which, of course, derives its signal from the infrared radiation appearing in the field of view. As was pointed out with respect to FIG. 1, the intensity-modulated light source 30 is applied via a condensing lens system through the reticle 20 which, in rotation, recreates the scene through the holes 23 of the reticle which was previously scanned by the holes 21 of the reticle. The recreated thermal image in visible form is superimposed on the visible image of the field of view through the optical means 14. A suitable power supply 56 is provided for the circuitry of FIG. 4.

Figure 5:
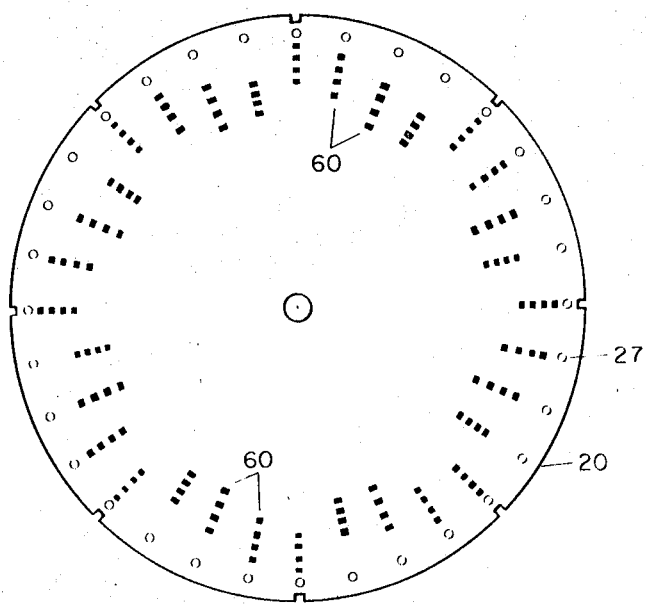
FIG. 5 shows another form of scanning reticle which may be utilized in the thermal image system of this invention.
Figure 6:
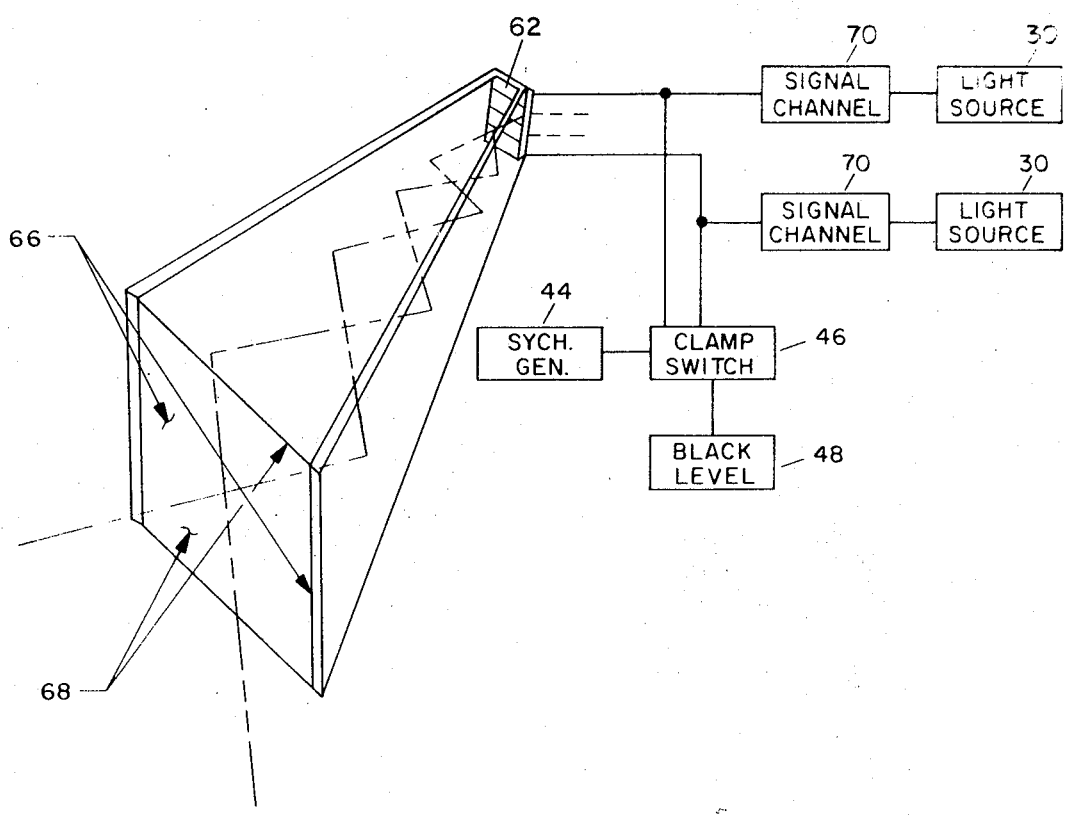
FIG. 6 illustrates a four-detector array suitable for use with the reticle of FIG. 5.

As has been pointed out, a variety of reticle patterns may be utilized in the present invention. Another approach is illustrated in FIGS. 5 and 6. The reticle 20 as shown in FIG. 6 includes the same sync pulse holes 27 around the periphery of the reticle. However, in this embodiment, eight groupings of four-hole sets 60 are placed around the circular reticle with the separation between sets 60 being 45°. This grouping provides a symmetrical system in which the playback function is easy to implement. With this arrangement a frame is produced by sets of four holes with four frames formed on each revolution of the reticle.

In conjunction with the reticle of FIG. 5, a four-detector array 62 shown in FIG. 6 is utilized. A wedge 64 having reflective surfaces 66 and emissive surfaces 68 is utilized to apply radiation imaged by the objective 18 through the reticle 20 onto the detector array 26. The infrared detector array may be a pyroelectric detector assembly as previously disclosed but in this case with four detector elements. However, other arrays such as a cooled detector array may be utilized. Assuming a 3 in. $f/2.5$ objective, each of the four detector elements (1.65 mm. squares stacked vertically) scans over only four lines of the raster. A frame is produced by sets 50 of four holes of 0.37 mm. displaced radially by 1.65 mm. center to center and arranged about a circle on the reticle 20 having a diameter of 4 in.

As will be seen in FIG. 6, the use of four detectors requires four signal channels 70 of the type shown in FIG. 4. However, the channels 70 are connected in shunt using the common control circuits, i.e., sync generator 44, clamp switch 46, and the black level control 48 for all four channels. The display system in this embodiment can use the same type of condensing optics in conjunction with the modulatable light sources 30 as shown in FIG. 1. The embodiment of FIGS. 5 and 6 offers considerable improvement in the signal-to-noise ratio of the system, reduces bandwidth and high-frequency cutoff by a factor of 4, reduces the detector area per element, and improves the speed of operating the reticle and increases the system sensitivity. The latter feature would enhance night viewing.

Accordingly, the thermal image system 10 as embodied in this invention may be utilized for displaying a superimposed visual image in blue or in green, depending upon the type of filter used, with the infrared rendition in red. Accordingly, the superimposed infrared image will have a red tinge when viewed through the optical system by the observer. The image obtained is enhanced by the visual sighting, and is sharper than if just a thermal image were used. This allows a lower resolution IR system to be utilized. The simplicity of the thermal image system which uses the Nipkow disc for scanning and playback, together with its mobility and maneuverability, make the instrument ideal for remote checking and inspection jobs from moving vehicles, and suitable for many other industrial process control and nondestructive testing applications.

I claim:

1. A thermal imaging system for providing a thermal image of a target scene superimposed on and distinguishable from the visual image of the same target scene comprising, in combination,
    a. optical means including a dichroic mirror for direct viewing of a visual image of a target scene,
    b. an infrared detector means,
    c. a light source and means for intensity modulating said light source in accordance with signals generated by said infrared detector means,
    d. an opaque rotatable scanning disc having a plurality of sets of holes therein arranged to simultaneously scan said infrared detector means over the target scene which is viewed by said optical means using at least one set of said holes, and said light source over the same scan pattern to reconstruct a thermal image of said target scene using at least another set of said holes, and
    e. means for applying said thermal image on said dichroic mirror in said optical means thereby superimposing said thermal image on said visual image in readily distinguishable form.

2. The thermal imaging system set forth in claim 1 including means for imaging said target scene on said rotatable scanning disc, and a field lens and a collecting cone positioned behind said reticle and in front of said infrared detector means for concentrating energy received from said target scene through the holes in said scanning disc onto said infrared detector means.

3. The thermal imaging system set forth in claim 1 wherein said means for applying said thermal image on said dichroic mirror includes a mirror on the opposite side of said scanning disc from said light source on which said thermal image is formed and a transfer lens is positioned to transfer said thermal image on said mirror to said dichroic mirror.

4. The thermal imaging system set forth in claim 1 wherein said infrared detector means comprises a plurality of infrared detectors cooperating with a plurality of sets of holes in said scanning disc to scan said target scene and a like number of cooperating light sources which are modulated by said infrared detector means.

5. The thermal imaging system set forth in claim 1 wherein one set of said plurality of sets of holes on said scanning disc has means cooperating therewith to produce synchronization pulses, and means are provided utilizing said pulses for setting a black reference level for said thermal image.

* * * * *